Aug. 8, 1967  E. C. HENRIKSEN  3,334,837
SELF-THREADING WEB REEL ASSEMBLY
Filed Oct. 24, 1965  2 Sheets-Sheet 1
Fig. 1.
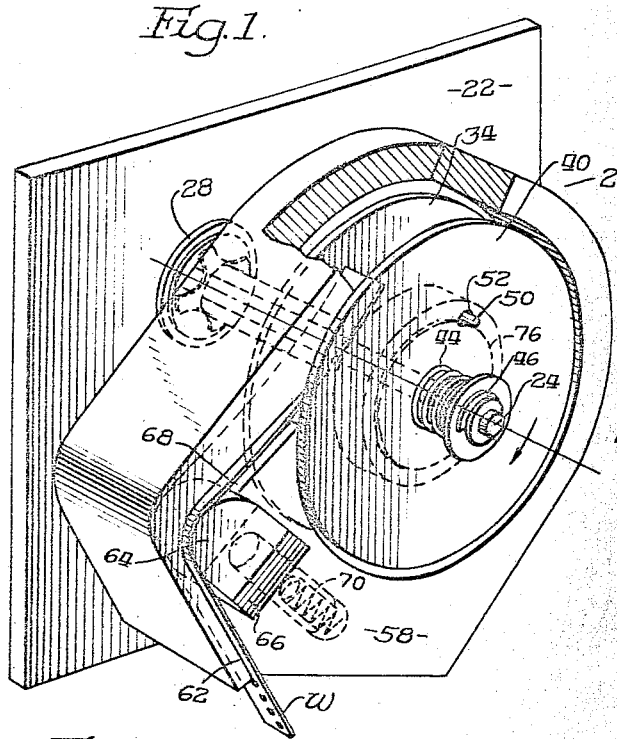
Fig. 2.
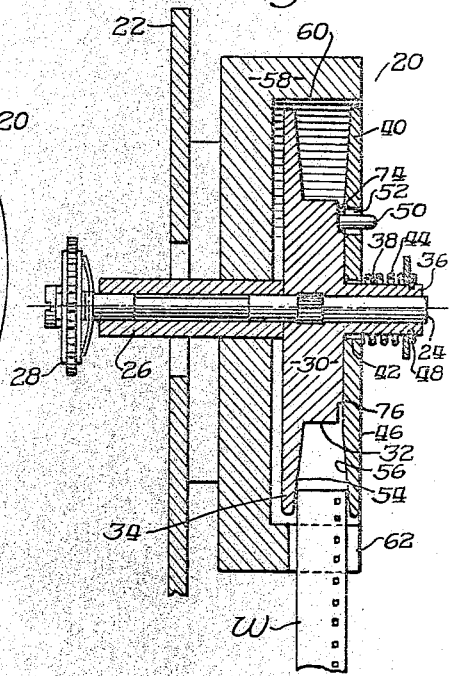
Fig. 3. (INITIAL POSITION)
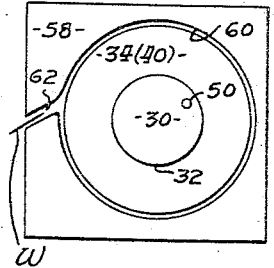
Fig. 4. (1 REV.)
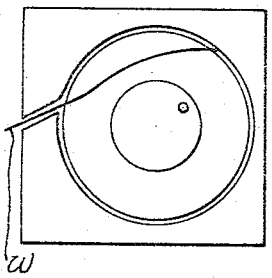
Fig. 5. (1.5 REV.)
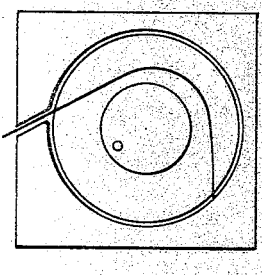
Fig. 6. (2 REV.)
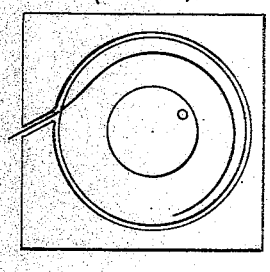
Fig. 7. (3 REV.)
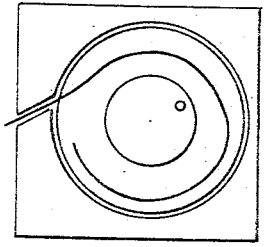
Fig. 8. (5 REV.)
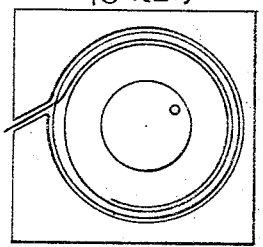
Fig. 9. (5.2 REV.)
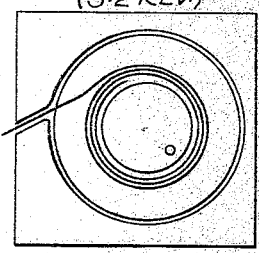
Fig. 10. (5.5 REV.)
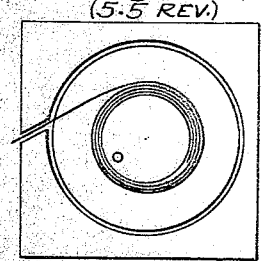
Inventor:
Elmer C. Henriksen.
By Barry L. Clark
John E. Peter Jr.
Attys (INITIAL POSITION)

(1 REV.)

(1.5 REV.)

(2 REV.)

(3 REV.)

(4.5 REV.)

(5.0 REV.)

United States Patent Office 3,334,837
Patented Aug. 8, 1967

3,334,837
SELF-THREADING WEB REEL ASSEMBLY
Elmer C. Henriksen, Chicago, Ill., assignor to Bell & Howell Company, Chicago, Ill., a corporation of Illinois
Filed Oct. 24, 1965, Ser. No. 504,358
16 Claims. (Cl. 242—74)

The present invention relates to improvements in the field of web reeling and, more particularly, a new and improved self-threading reel mechanism wherein the end of a web is fed into a position between the flanges of a reel which automatically grasp the web and wind it about the hub of the reel. Such reels are particularly useful in video tape machines, moving film projectors, cameras, tape recorders, and other data recording and reading devices wherein it is necessary to provide rapid, fool-proof winding of a tape or web onto a reel. The term "web" is used in a generic sense and should be understood to mean any long, flat, flexible tape-like member such as recording tape, video tape, photographic film or any other ribbon-like member.

In the field of web reeling it has been general practice to employ reels having a slot or clip on the hub thereof for the purpose of manually attaching the free end of the web thereto so as to enable the winding of the remainder of the web onto the reel. Upon rewind, however, many of these reels require that the web's end be manually removed from its engagement with the hub. This is a time consuming operation and therefore undesirable. Another inherent deficiency of such reels is that they must be located in an easily accessible position and cannot be used in the interior portions of the parent machine.

It has also been the practice to manually roll several convolutions of a web about a reel hub so as to provide sufficient frictional engagement of the web with the reel to permit the reel to continue to wind the remainder of the web upon the reel which is subsequently driven by a power means. Although these devices have served their purposes, they have not always given satisfactory performance in that they too require time consuming manual manipulations and a certain amount of manual dexterity on the part of the operator. Because these reels require manual operations, they are further disadvantaged by the fact that they must be located in readily accessible portions of the machine. This often results in complicated and elongated feed paths and a bulky mechanism which adds to the overall cost of the apparatus and often impairs the apparatus' primary functional purpose.

Other conventional reels employ pins extending from the hub for entry into perforations in the web. A great disadvantage of reels of this type is that they tend to tear and mutilate the web end so as to require frequent replacement of the leader end of the web.

Other conventional web winding reels such as that disclosed in U.S. Patent No. 2,015,860 for winding movie film, employ somewhat complicated reel structure. These reels have plural biasing means located a considerable distance from the axis of rotation for biasing one of the reels' flanges toward the other flange thereof so as to engage the edges of the web inserted therebetween. Such reels have functioned adequately for their intended purpose when the web is inserted therein at relatively low speed; however, such reels do not provide the complete reliability required in modern high speed equipment and must be located so as to be readily accessible in case of malfunction of the reel. Moreover, because the biasing force is applied at such a distance from the hub, a relatively large bias force is applied to the web edges. The magnitude of the biasing force is somewhat critical and although this type of reel is fairly satisfactory for very thick webs, it is not at all satisfactory for thin webs since the thinner webs tend to be twisted or deflected rather than grasped by the flanges.

With the advent of higher web transport speeds, the time required to feed and attach a web to a take-up reel becomes a very important point for consideration if maximum utility of the device is to be obtained. Thus, the desire to minimize or eliminate all unnecessary time-consuming operations has become of paramount importance. These conditions indicate the desirability of reliable web take-up reels which function rapidly without manual manipulations or constant observation.

In accordance with the principles of this invention, a drivable reel, having flanges with inwardly facing tapered surfaces, is mounted within a recess in an enclosing structure. One flange is biased toward the other so that when the reel is driven, the surfaces engage the edge of a web to pull the web inwardly into a complete convolution about the hub of the reel so as to provide for reeling a length of the web about the hub.

In another embodiment, one reel flange, angled relative to the reel's rotational axis, wobbles to vary the spacing between the flange inner surfaces. Since the web is slightly wider than the smallest spacing between the surfaces, the end of the web inserted between the flange surfaces will be grasped thereby.

It is, therefore, a primary object of this invention to provide a take-up reel assembly that will function with complete reliability and dependability.

Another object of this invention is to provide a take-up reel assembly that will function with no manual manipulations by the operator.

A further object of this invention is the provision of a take-up reel that will automatically wind flexible webs thereon.

A still further object of this invention is the provision of a take-up reel that will function with such complete reliability as to be feasibly located in inaccesible positions.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIGURE 1 is a perspective view of a first embodiment of this invention.

FIGURE 2 is a bisecting sectional view of the first embodiment of this invention.

FIGURES 3 through 10 are views of the reel of the first embodiment illustrating successive steps in the engagement of a web end in the reel.

Figure 11:
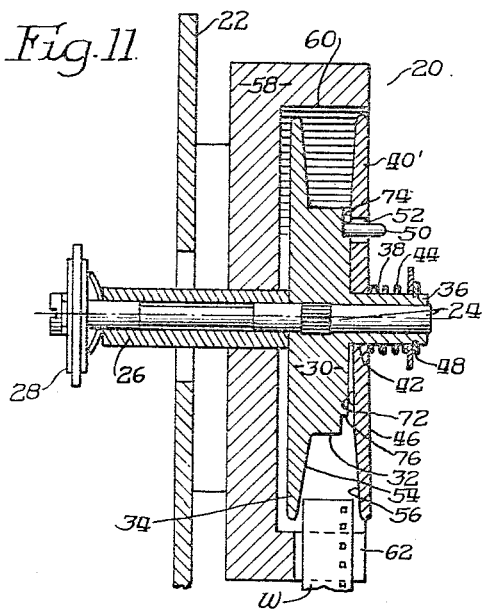
FIGURE 11 is a bisecting sectional view of a second embodiment reel structure.

Referring now, to the drawings, the preferred embodiment of this invention is for a web-reel means and associated mounting and infeed means for reeling a web of movie film and is generally designated 20 as shown in FIGURE 1. The web-reel means is mounted on a frame or other structural element 22 of the parent machine in which the reel is employed. A shaft 24 is mounted in suitable bearings 26 attached to the frame member in any conventional manner. The shaft is driven through a slip clutch means, or any other conventional friction drive means 28. Friction drive means 28 is driven from the drive motor of the parent device or from any other rotational drive means. A hub member 30 is fixed to shaft 24 for rotation therewith and is concentric with respect to the axis shaft 24. The hub member 30 has an outer film receiving surface 32 which is also concentric with the axis of shaft 24. A first flange member 34 is formed integrally with hub 30 at one axial end thereof as shown in FIGURE 2.

A flange-supporting member 36 extends axially from the other end of the hub and has an outer flange-supporting surface 38 concentric to the axis of shaft 24. A second flange 40 is slidably mounted on flange-supporting surface 38 for axial movement toward and away from the hub 30. A circular hole 42 in flange 40 encircles the flange supporting surface 38 and has a slightly greater diameter than the diameter of the flange supporting surface 38 to enable easy axial movement of the flange 40 and to also permit the flange to pivot slightly. A flange biasing coil spring 44 is mounted on the flange-support member 38 so that one end of spring 44 engages the outer face 46 of flange 40 at an inner radial surface near the flange supporting surface and the other end of spring 44 engages a clip member and washer means 48 fixed to the end of flange support 36. Consequently flange 40 is constantly biased from a central area thereof toward hub 30. A drive pin 50 extends from one end of hub 30 through an aperture 52 in flange member 40 to provide a fixed rotational drive of flange 40 by hub 30. Flange members 34 and 40 have inwardly facing smooth surfaces 54 and 56, respectively. Surfaces 54 and 56 are slightly tapered as shown in FIGURE 2 so that the axial distance between said flanges is slightly less at their innermost portion adjacent to surface 32 than is the case at the outermost circumferential areas of said flanges. The distance between all portions of the inner faces of flanges 54 and 56, other than the outermost edges of the inner faces adjacent the peripheral edges of the flanges, is slightly less than the width of the film so as to enable the inwardly facing surfaces to grasp the edge of a film that is fed therebetween.

The hub and associated flange members are mounted within an enclosing member 58, a portion of which is cut away for clarity in FIGURE 1. Hub enclosing member 58 has a recessed circular opening 60 therein which is concentric about the axis of shaft 24 and which has a slightly greater diameter than the diameters of flanges 34 and 40. Flanges 34 and 40 are wholly within the confines of recessed opening 60 as illustrated in FIGURE 2. A narrow film feed slot 62 communicates between recessed opening 60 and the outer surface of enclosing member 58. Film feed slot 62 is oriented so that a film end fed from same extends chordally with respect to the flanges between the flanges and between the film receiving surface 32 and the outer peripheries of the flanges. A spring-biased tensioning member 64 is mounted in a slot 66 communicating with film feed slot 62 and extends into slot 62 to engage the film W therein. Tensioning member 64 is limited in its movement into film feed slot 62 by abutment 68 which prevents movement of tensioning member 64 completely across film feed slot 62 so as to block slot 62. Tensioning member 64 maintains film W in a proper degree of tension as determined by a spring constant of spring 70. A spring biased roller or other equivalent structure could also obviously be used in place of member 64 if such were desired.

The manner in which the reel is substantially completely enclosed by opening 60 is very advantageous since there is no way in which the film can be deflected from between the flanges. The curved wall portion of opening 60 also serves, in some instances, to guide the film into a partial convolution until there is sufficient frictional engagement between the flanges and the film to grasp the film and wind it about the hub in the manner to be discussed more explicitly hereinafter.

The operation of the above-described structure will now be discussed with a reference to FIGURES 3 through 10. Shaft 24 is driven at a constant angular velocity by friction drive means 28 and as a consequence, thereof, hub 30 and flanges 34 and 40 are driven at the same angular velocity. The film which is fed by conventional means into film feed slot 62 at a linear velocity that is less than the surface velocity of all portions of the inner surfaces of the flanges. The film emerges from the inner end of slot 62 and enters between flanges 34 and 40 and is engaged by the inner surfaces 54 and 56 as illustrated in FIGURES 2 and 11. The revolving movement of the flanges draws the film into a tightening convolution about film-supporting surface and continued rotation of the reel structure winds the film onto the hub as shown in FIGURES 3 through 10. FIGURES 3 through 10, which are considered to be self-explanatory, sequentially illustrate the steps by which a film end is engaged by the reel and wound thereon. FIGURES 4 through 10 each contain a caption indicating the number of revolutions through which the reel has revolved from the time when the film first began to emerge from film-feed slot 62 as illustrated in FIGURE 3.

The initial engagement of the end of the film between the inner faces of the flange members 34 and 40 is such that flange member 40 is tilted slightly against the bias spring element 44. In order to minimize the force required for such pivoting action (which force is provided by the rigidity of the film) the single spring element 44 is located as close to the axis of the structure as possible and the spring constant of said spring is of a low value. The slight clearance between the hole 42 in flange 40 and the surface of flange support 36 as illustrated in FIGURE 2 also serves to minimize the resistance to the pivoting of flange 40.

Hub 30 is provided with a circular recess 74 about the entire right end thereof as shown in FIGURE 2 to provide an inwardly spaced circular pivot edge 76 which enables an easy pivoting of flange 40.

In another embodiment of the invention, illustrated in FIGURE 11, the primary distinction from the first embodiment is that the inner surface of movable flange 40' has a hub engaging abutment 72 extending therefrom for engagement with the end of hub 30 as illustrated in FIGURE 11. Since the remaining elements are identical with those of the previous embodiment the same designators are applied in FIGURE 11 as in FIGURES 1 and 2. When spring 38 biases flange 40' against hub 30 abutment 72 engages the hub and causes the flange to be oriented at a slight angle to the axis of rotation so that the flange rotates in a wobbling manner. It will be seen, accordingly, that rotation of the reel structure past a stationary point between the flanges presents a continuing variable axial distance between the innermost faces of the flanges with the distance varying from a maximum to a minimum with each rotation of the reel. The abutment 72 extends outward from flange 40' only a small amount so that the maximum distance between opposed portions of the inner surfaces 54 and 56 is slightly greater than the width of the film and the minimum distance between said surfaces is slightly less than the width of the film. The area of maximum distance will obviously be located at a point 180° around the circumference of the reel from the area of minimum distance. This embodiment is otherwise identical with the first preferred embodiment in all respects.

Figure 12:
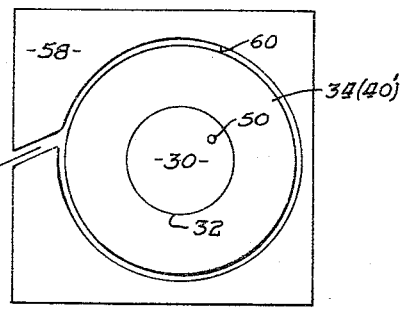
FIGURES 12 through 18 are views of the reel of the second embodiment illustrating successive steps in the engagement of a web end in the reel.
Figure 13:
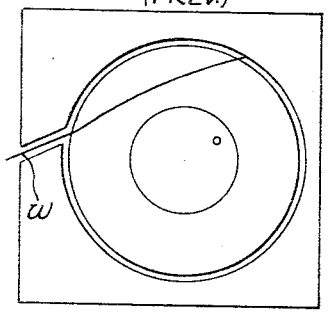
Figure 14:
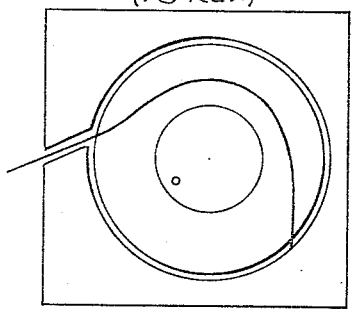
Figure 15:
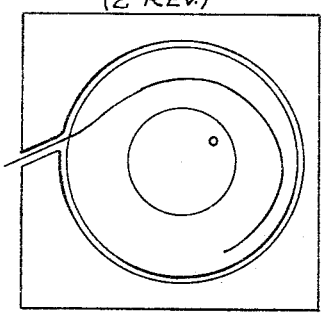
Figure 16:
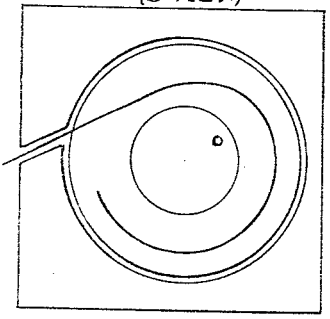
Figure 17:
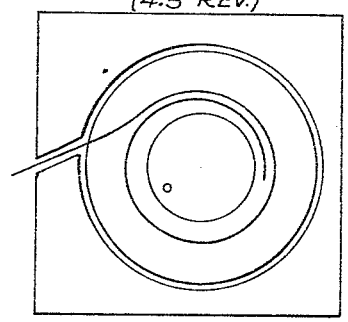
Figure 18:
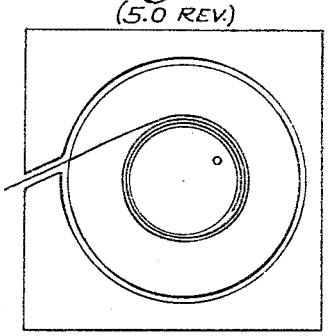

The manner in which the second embodiment of the invention engages the free end of the film fed thereto is illustrated in FIGURES 12 through 18. The film end is fed from film feed slot 62 to a point between the rotating flanges at a linear velocity less than the linear velocity of any point on the tapered surfaces of the flanges. Since the flanges are moving at a higher velocity than the film, the flanges will rotate past the edges of the film until the inner surfaces of the flanges engage the edge of the film in the vicinity of the area of minimum axial spacing between the flanges so as to grasp the film and draw it in a convolution about surface 32. As the film is wound about the hub portion and a plurality of layers accumulate thereon the edges of the film push outwardly against the flange so as to substantially align it in a plane perpendicular to the axis of the reel. FIGURES 12 through 18, which are considered to be self-explanatory, sequentially illustrate the steps by which the film end is engaged by the reel and wound thereon. FIGURES 13 through 18 each contain a caption indicating the number of revolutions through which the reel has revolved from the time when the film first began to emerge from the film-feed slot 62 as illustrated in FIGURE 12.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A take-up reel means for receiving an elongated web one end of which is fed to said reel for gripping engagement by said reel so as to wind said web upon said reel, comprising:
   a driven hub member having an axis of rotation and having an axially concentric web-supporting outer surface radially spaced a first distance from said axis and having an axial extent slightly less than the width of the web and having first and second end surfaces perpendicular to said axis which end surfaces define the axial extent of said hub member;
   a flange support member extending axially from said second end surface beyond the axial extent of said web supporting outer surface and having a flange supporting surface coaxial with said axis and spaced from said axis a second distance that is less than said first distance;
   a first flange member extending radially with respect to to said axis from said first end surface of said hub and having an inwardly facing surface, said first flange member being rotatably driven with said hub;
   a second flange member extending radially from a point adjacent to said second end surface and axially slidably mounted on said flange supporting surface and having an inwardly facing surface and being rotatably driven by said hub member and wherein said second flange member is capable of a slight pivoting movement on said flange supporting surface;
   means mounted on said flange support member in close proximity to said support member for biasing said second flange toward said hub member, wherein at least one of said inwardly facing surfaces of said flange members are inclined at an angle with respect to said axis so that the axial distance between said inwardly facing surfaces varies in proportion to the radial distance from said axis so that a web end fed between the peripheries of said flanges at a speed less than the speed of the inwardly facing sufaces of the flanges is frictionally engaged and held by said flanges so as to be moved radially inwardly thereof to form a complete convolution engaging said web-supporting outer surface of said hub.

2. The device of claim 1 further including;
   an abutment means radially spaced from said axis and mounted on said second flange for engagement with said second end surface of said hub so that said flange is oriented at an angle to said axis and rotation of said flange produces a wobbling movement of said flange with respect to said axis and the axial distance between inner surfaces of said flanges at a stationary reference point where the end of the web is fed between said flanges continuously varies cyclically with each revolution of said reel between a maximum distance which is slightly greater than the width of said web and a minimum distance that is slightly less than the width of said web so that the end of the web fed to said reference point will be grasped by said inner surfaces as such approach said minimum axial distance.

3. The device of claim 2 wherein said hub is mounted on a shaft that is driven by a slip clutch.

4. The device of claim 2 wherein said first flange and said hub member are integral.

5. A reel means comprising;
   a hub member having a rotational axis;
   first and second flange means mounted on said hub means and each having a central axis;
   said first and second flange means having inwardly facing tapered surfaces and one of said flange means being tilted with respect to said rotational axis so that the central axis of said one of said flange means is at a slight angle to the axis of rotation of said hub member.

6. A driven take-up means for receiving an elongated web one end of which is fed to said take-up means so as to wind said web on said take-up means comprising:
   a rotatively driven hub member having a central axis of rotation;
   a first flange extending radially from one end of said hub member and having an inwardly facing tapered surface;
   a second flange member mounted adjacent the other end of said hub member and having an inwardly facing tapered surface which faces the inwardly facing surface of said first flange wherein the axial distance between said tapered surfaces varies in proportion to the radial distance from said axis;
   means aixally biasing said second flange towards said first flange and against said hub member and
   abutment means between said one of said flanges and said hub for aligning said flange at an angle with respect to said axis so that rotation of said one of said flanges produces a wobbling movement of said one of said flanges with respect to said axis and the axial distance between said inner surfaces of said flanges at a stationary reference point between said flanges continuously varies cyclically with each revolution of said reel between a maximum distance that is slightly greater than the width of said web and a minimum distance that is slightly less than the width of said web so that the end of a web fed to said reference point will be grasped by said inner surfaces as such approach said minimum axial distance.

7. The device of claim 6 wherein said abutment means consists of an extension on said second flange which engages said hub.

8. The device of claim 6 wherein the means for biasing said one of said flanges is in close proximity to said axis.

9. The device of claim 6 wherein said hub is driven by a friction drive means.

10. A take-up reel means for receiving an elongated web one end of which is fed to said reel at a given infeed feed speed for gripping engagement set by said reel so as to wind said web upon said reel comprising:
    a hub member coaxial with a shaft and fixedly mounted on said shaft for rotation therewith, said hub member having an axially concentric web supporting outer surface radially spaced a first radial distance from said axis and having an axial extent slightly less than the width of the web and having first and second end surfaces perpendicular to said axis;
    a flange support member extending axially from said second end surface beyond the axial extent of said web supporting outer surface and having a flange supporting surface coaxial with said axis and radially spaced from said axis a second distance which is less than said first distance;
    a first flange member extending radially with respect to said axis from a point adjacent said first end surface and having an inwardly facing surface;
    a second flange member extending radially from a point adjacent said second end surface and being axially slidably mounted on said flange supporting surface;
    an inwardly facing surface on said second flange member;

a friction drive means for rotating said hub so that said inwardly facing surfaces of said flanges move at a speed greater than the infeed speed of the web; an abutment means radially spaced from said axis mounted on said second flange member for engagement with said second end surface of said hub;

means mounted on said flange support member in close proximity to said axis for biasing said second flange member toward said hub so that said abutment means engages said second end surface of said hub and said second flange is oriented at an angle to said axis and rotation of said second flange produces a wobbling movement of said second flange with respect to said axis and the axial distance between said inwardly facing surfaces of said flanges at a stationary reference point between said flanges continuously varies cyclically with each revolution of said flanges between a maximum distance which is slightly greater than the width of said web and a minimum distance that is slightly less than the width of said web so that the end of a web fed to the reference point will be grasped by the inwardly facing surfaces as such approach said minimum axial distance.

11. The device in claim 10 wherein said drive means is a shaft driven by a frictional clutch.

12. A take-up reel means for receiving an elongated web one end of which is fed to said reel for gripping engagement by said reel so as to wind said web upon said reel comprising:

a rotatably supported driven shaft member having a central axis of rotation;

slip clutch means for driving said shaft;

a hub member coaxial with said shaft and fixed to said shaft, said hub member having an axially concentric web supporting outer surface radially spaced a first distance from said axis and having an axial extent slightly less than the width of the web and first and second end surfaces perpendicular to said axis;

a flange support member extending axially from said second end surface beyond the axial extent of said web supporting outer surface and having a flange supporting surface coaxial with said axis and spaced from said axis a distance that is less than said first distance;

a first flange member that is integral with said hub member extending radially with respect to said axis from said first end surface of said hub member and having an inwardly facing surface;

a second flange member extending radially from a point adjacent said second end surface and being axially slidably mounted on said flange supporting surface and having an inwardly facing surface and being rotatably driven by said hub member;

means mounted on said flange support member and in close proximity to said support member for biasing said second flange towards said hub member;

wherein at least one of said inwardly facing surfaces of said flange members are inclined at an angle with respect to said axis so that the axial distance between said inwardly facing surfaces varies in proportion to the radial distance from said axis so that a web end fed between the peripheries of said flanges at a speed that is less than the speed of the flanges is frictionally engaged and held by said flanges so as to be moved radially inwardly thereof to form a complete convolution engaging said web supporting surface of said hub.

13. A take-up reel means assembly for receiving an elongated web one end of which is fed to said reel for gripping engagement by said reel so as to wind said web upon said reel means assembly comprising:

an enclosing member having a circular opening therein;

a web feed slot in said enclosing member communicating with said circular opening;

a driven hub member located within said circular opening having an axis of rotation which is coextensive with the axis of said circular opening and having an axially concentric web-supporting outer surface radially spaced a first distance from said axis and having an axial extent slightly less than the width of the web and having first and second end surfaces perpendicular to said axis which end surfaces define the axial extent of said hub member;

a flange support member extending axially from said second end surface beyond the axial extent of said web supporting outer surface and having a flange supporting surface coaxial with said axis and spaced from said axis a second distance that is less than said first distance;

a first flange member extending radially with respect to said axis from said first end surface of said hub and having an inwardly facing surface, said first flange member being rotatably driven with said hub;

a second flange member extending radially from a point adjacent to said second end surface and axially slidably mounted on said flange supporting surface and having an inwardly facing surface and being rotatably driven by said hub member wherein said second flange member is capable of a slight pivoting movement on said flange supporting surface wherein both of said flanges are of a diameter slightly less than the diameter of said circular opening and both of said flanges are located within the confines of said circular opening; and means mounted on said flange support member in close proximity to said support member for biasing said second flange toward said hub member, wherein at least one of said inwardly facing surfaces of said flange members are inclined at an angle with respect to said axis so that the axial distance between said inwardly facing surfaces varies in proportion to the radial distance from said axis so that a web end fed from said web feed slot to a position between the peripheries of said flanges at a speed less than the speed of the inwardly facing surfaces of the flanges is frictionally engaged and held by said flanges so as to be moved radially inwardly thereof to form a complete convolution engaging said web-supporting outer surface of said hub.

14. The device of claim 13 further including:

an abutment means radially spaced from said axis and mounted on said second flange for engagement with said second end surface of said hub so that said flange is oriented at an angle to said axis and rotation of said flange produces a wobbling movement of said flange with respect to said axis and the axial distance between inner surfaces of said flanges at a stationary reference point where the end of the web is fed between said flanges continuously varies cyclically with each revolution of said reel between a maximum distance which is slightly greater than the width of said web and a minimum distance that is slightly less than the width of said web so that the end of the web fed to said reference point will be grasped by said inner surfaces as such approach said minimum axial distance.

15. The device of claim 14 wherein said hub is mounted on a shaft that is driven by a slip clutch.

16. The device of claim 14 wherein said first flange and said hub member are integral.

References Cited

UNITED STATES PATENTS 2,015,860  10/1935  May _____ 242—74
2,392,492  1/1946  Morgan et al. _____ 242—74

FRANK J. COHEN, *Primary Examiner.*

N. L. MINTZ, *Assistant Examiner.*